July 14, 1953 H. M. FLEMING 2,645,417

TRUE NEGATIVE TOTAL RECORDING MECHANISM

Filed June 2, 1951 11 Sheets-Sheet 1

INVENTOR
HOWARD M. FLEMING
BY Elmer M Edwards
AGENT

July 14, 1953 H. M. FLEMING 2,645,417

TRUE NEGATIVE TOTAL RECORDING MECHANISM

Filed June 2, 1951 11 Sheets-Sheet 2

INVENTOR
HOWARD M. FLEMING
BY Elmer M. Edwards
AGENT

July 14, 1953 H. M. FLEMING 2,645,417

TRUE NEGATIVE TOTAL RECORDING MECHANISM

Filed June 2, 1951 11 Sheets-Sheet 3

INVENTOR
HOWARD M. FLEMING
BY
Elmer M. Edwards
AGENT

July 14, 1953 H. M. FLEMING 2,645,417

TRUE NEGATIVE TOTAL RECORDING MECHANISM

Filed June 2, 1951 11 Sheets-Sheet 4

Inventor

By

HOWARD M. FLEMING

Elmer M. Edwards

AGENT

July 14, 1953 H. M. FLEMING 2,645,417

TRUE NEGATIVE TOTAL RECORDING MECHANISM

Filed June 2, 1951 11 Sheets-Sheet 5

INVENTOR
HOWARD M. FLEMING
BY Elmer W. Edwards
AGENT

July 14, 1953 H. M. FLEMING 2,645,417

TRUE NEGATIVE TOTAL RECORDING MECHANISM

Filed June 2, 1951 11 Sheets-Sheet 6

INVENTOR
HOWARD M. FLEMING
BY
Elmer M. Edwards
AGENT

July 14, 1953 H. M. FLEMING 2,645,417

TRUE NEGATIVE TOTAL RECORDING MECHANISM

Filed June 2, 1951 11 Sheets-Sheet 7

INVENTOR

HOWARD M. FLEMING

BY

Elmer M. Edwards

AGENT

TRUE NEGATIVE TOTAL RECORDING MECHANISM

Filed June 2, 1951 11 Sheets-Sheet 8

INVENTOR
HOWARD M. FLEMING
BY
Elmer M. Edwards
AGENT

INVENTOR
HOWARD M. FLEMING
BY Elmer M. Edwards
AGENT

TRUE NEGATIVE TOTAL RECORDING MECHANISM

INVENTOR
HOWARD M. FLEMING
BY
Elmer M. Edwards
AGENT

July 14, 1953 H. M. FLEMING 2,645,417
TRUE NEGATIVE TOTAL RECORDING MECHANISM
Filed June 2, 1951 11 Sheets-Sheet 11

INVENTOR
HOWARD M. FLEMING
BY
Elmer W. Edwards
AGENT

Patented July 14, 1953 2,645,417

UNITED STATES PATENT OFFICE 2,645,417

TRUE NEGATIVE TOTAL RECORDING MECHANISM

Howard M. Fleming, West Orange, N. J., assignor to Monroe Calculating Machine Company, Orange, N. J., a corporation of Delaware Application June 2, 1951, Serial No. 229,581

16 Claims. (Cl. 235—60.2)

The invention relates to adding listing machines, and more particularly to novel devices for adapting said machines to the preparation of a customer's statement sheet.

The invention is particularly useful in small establishments which do not have need for elaborate bookkeeping machines, but which have need for a simple adding listing machine, and also in those establishments which, for example, do use bookkeeping machines for posting their accounts receivable but do not prepare customers' statements simultaneously with the posting of charges and credits to the individual customer's account.

The preparation of customers' statements wherein all the posting is done at a convenient posting period requires handling of invoices of various dates, and it might also involve credit entries which, in total, exceed the debit postings, in which case the account would show a credit balance total.

The present invention contemplates use of the higher orders of the register actuating and printing devices of a listing adding machine as a means for printing dates along with the printing of various item values to be registered in the lower order columns, upon a customer's statement sheet. Also, the printing of any complemental item value total registered in the lower order columns will be printed as a true credit balance total. This is accomplished without sacrificing the capacity of the machine for use in other operations, such operations including also the printing of a true negative total value as controlled from the highest order register actuating means provided in the machine.

In a machine having negative total control devices operable by an overdraft carried up to the extreme left hand column registering means, the use of the higher orders of the registering means as a dater would, unless otherwise provided for, effect an undesirable operation of the negative total control devices and cause a plus value item total in the right hand columns of the register to be printed as a complemental value.

Means are provided therefore in the present invention for disabling the full capacity place overdraft control means when the higher order register actuating and printing means are to be used for date printing purposes.

The invention also provides means for controlling the registration and printing of a true credit balance total from a selective portion of a register when said selective portion indicates a complemental total value registration.

The invention further provides means for controlling the registration and printing of a true credit balance total from alternatively selected control columns of the register.

Manually settable means for selectively predetermining the ordinal value column from which the control for a true negative total value is effected is also provided.

With the foregoing and incidental features in view, the invention includes the novel features of construction and combination of parts, the essential elements of which are set forth in the appended claims and a preferred embodiment of which is hereinafter described with reference to the drawings which accompany and form a part of this specification.

In general, a manually adjustable lever fulcrumed at the left hand side of the machine is adapted when in forward position to condition the machine for normal operations whereby the full capacity of orders provided in the setting, registering and printing devices are utilized for adding-listing in the usual manner well known in the art and as will be hereinafter described.

A rearward positioning of the lever, however, will condition the machine for the purpose of preparing a customer's statement sheet in which the present invention contemplates printing the related date to the left of each item value printing. For this purpose the left hand type bar in place of the usual 0–9 type is provided with 12 type corresponding to the abbreviations for the months of the year. Related keys on the keyboard selectively limit the forward movement of a twelve step index bar and control positioning of said type to the printing line in the well known manner, and as hereinafter described in connection with the digit type bar setting. The higher order banks of digit setting keys and their related register actuating and printing means are utilized for the purpose of printing the days of the month. Also, if the item values as accumulated in that portion of the register to the right of the date means is a credit value total, said total will be printed as a true negative total value.

The invention is shown as applied to a listing adding machine of well known type such as that disclosed in its essential features in U. S. Patent 1,932,013, issued October 24, 1933, to Loring P. Crosman, and as modified by the disclosures of Patents 2,307,669 and 2,330,270, issued to the same inventor on January 5, 1943, and September 28, 1943, respectively.

In so far as it is expedient, the parts hereinafter described which correspond to like parts in the foregoing patents will be similarly numbered and reference is made to these patents for details of construction not completely described in the following specification.

*Adding and subtracting*

Figure 1:
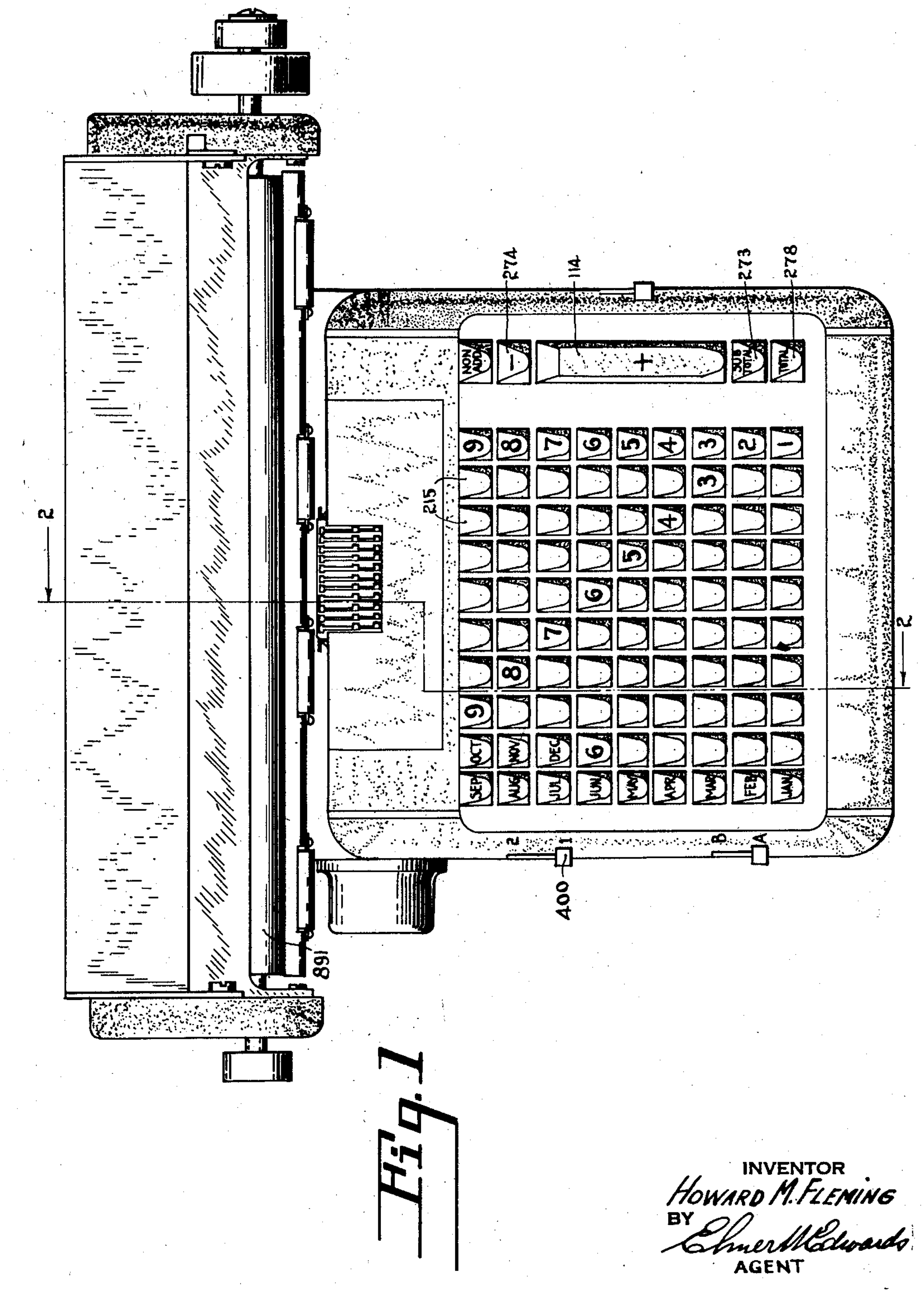
Fig. 1 is a diagrammatic plan view of a machine embodying the invention.

As set forth in the reference patents, amounts set up on digit keys 215 (Figs. 1 and 2) for each denominational order are transferred, additively or subtractively, upon operation of plus key 114 or minus operating key 274, to a series of accumulator wheels 473 by means of a series of spring operated differential actuators 610 loosely mounted upon a transverse shaft 608. The forward arm of each differential actuator lever 610 is provided with segmental rack teeth, adapted to mesh with the pinions 472 of the series of accumulator wheels 473. Index bars 615 are pivotally connected with the upper arms of levers 610, these index bars being moved, upon counter-clockwise rotation of the levers, into engagement with the stems of selectively depressed keys 215. The type bars 611 are pivotally connected to the rearward arms of levers 610, each type bar being provided with a longitudinally disposed series of type representing the digits 0 and 1 to 9.

The digit keys 215 which have been depressed to represent a value are latched in position with the bottoms of their stems lying in the path of movement of the related stop lugs of the bars 615, allowing such bars to advance a distance proportional to the value of the key, upon operation of the machine. Depression of a digit key will also remove a column latch 214 from the path of movement of its selected stop bar 615, these latches preventing movement of a stop bar and lever 610 in any column in which no key is depressed.

Each of the racks 610 are held in their normal clockwise position against tension of their respective springs 683, by a stud 659 fast in said racks and having engagement with a series of dogs 617 pivotally mounted upon a transverse rod 618 supported within a rocker frame 616 loosely mounted on the shaft 608.

A rock shaft 301 (Fig. 3) is oscillated by means of an electric motor 100 connected through suitable gearing and clutch means 103—104 with a rock arm 316, fast with shaft 301, by means of a connecting rod 108, so that as a crank arm 105 is rotated by the motor shaft 301 will be oscillated.

Figure 11:
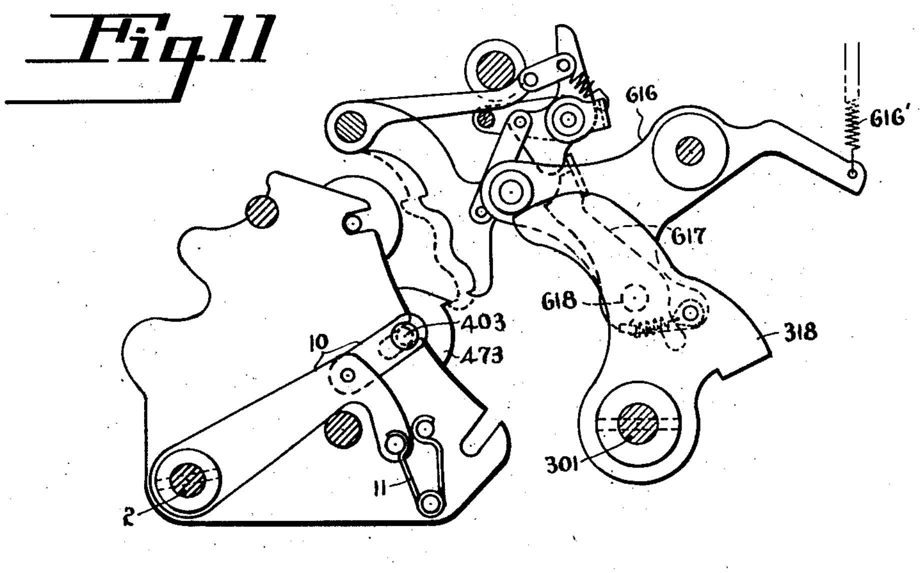
Fig. 11 is a detail elevation of the zeroizing means for the registers.

Rock shaft 301 is provided with cam means 318 (Fig. 11) for governing the movement of frame 616. As shaft 301 is rotated forwardly cam 318 will permit frame 616 under influence of spring 616' to be rocked counter-clockwise and any of the levers 610 which have been released by the depression of digit keys 215 will be allowed to rotate under influence of their springs 683 until they are stopped by the lugs of bar 615 contacting with the stems of the depressed keys. Upon rearward return movement of shaft 301 the cam 318 will restore frame 616 and the dogs 617 will return the operated levers 610 to normal position. This excursion of the levers 610 serves to register amounts set in the keyboard upon one or more accumulators 473 and to set up a similar amount on the printing line of the type bars.

Figure 3:
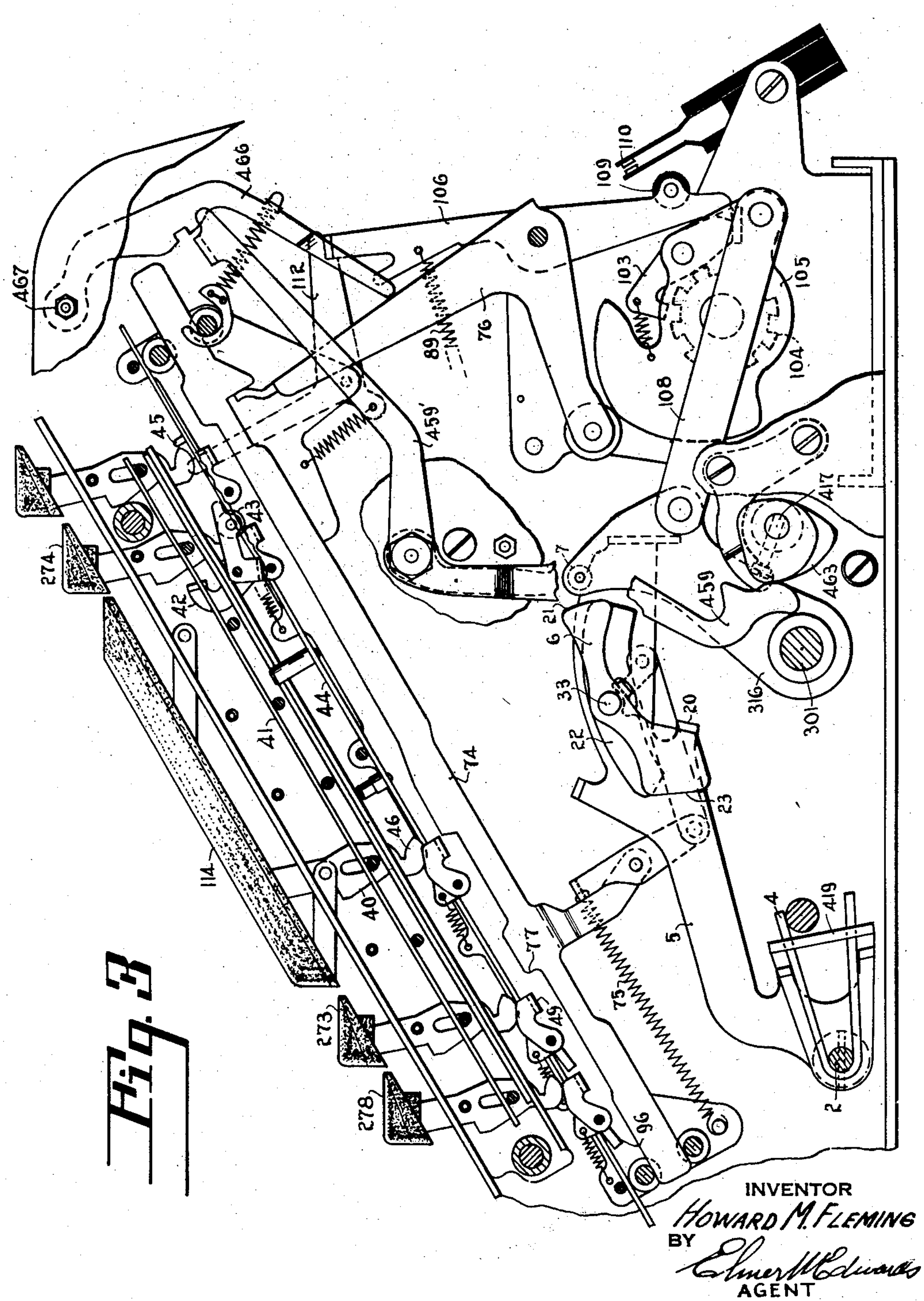
Fig. 3 is a right hand elevation, the framing being broken away, showing the operating keys, the operations control slide and parts operated thereby.
Figures 14, 15:
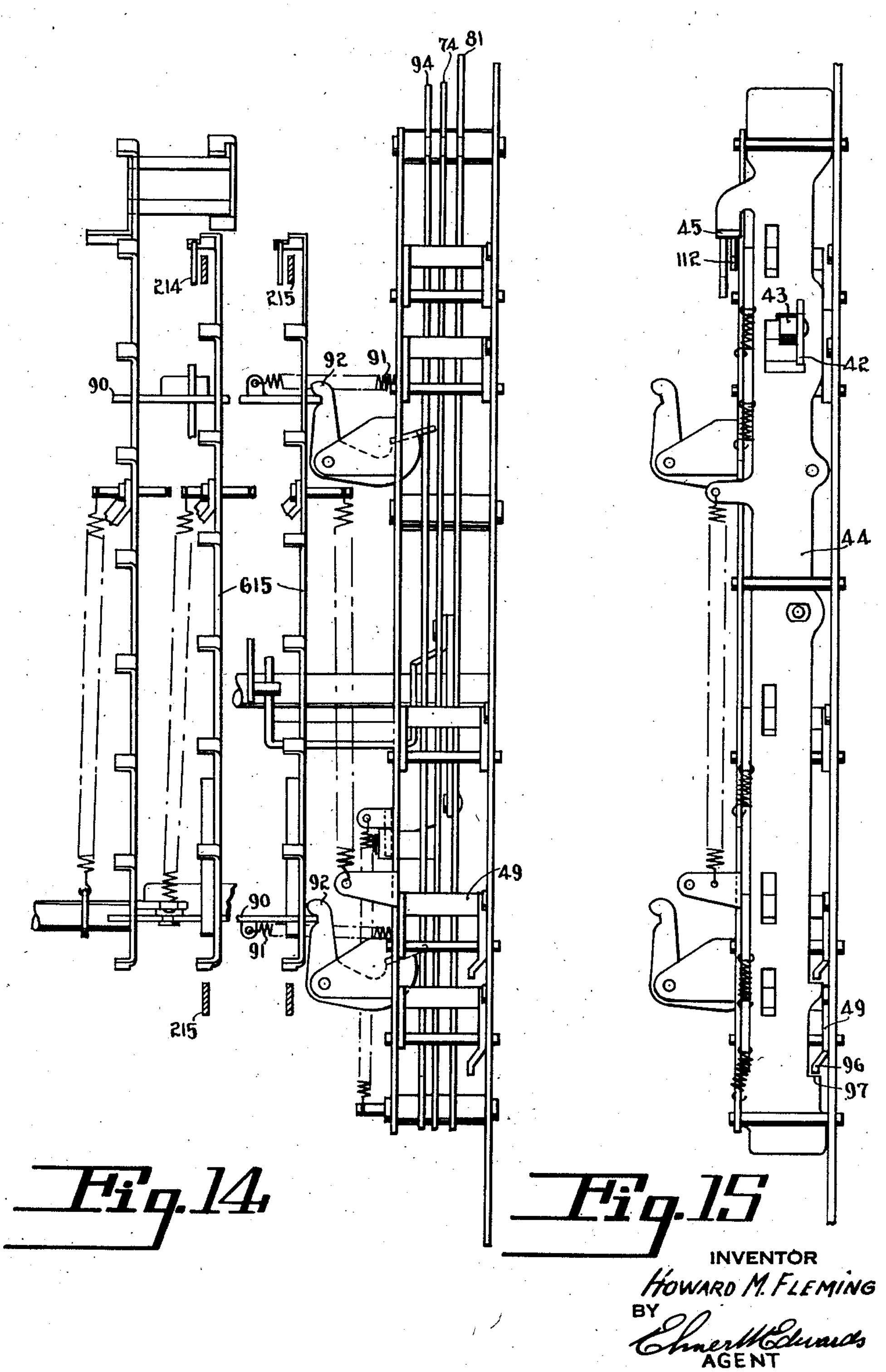
Fig. 14 is a detail plan view of the operation control slides and associated parts.
Fig. 15 is a detail plan view of the clutch release slide.

Release of clutch pawl 103 is effected upon depression of any of the motor keys, the stems of which are provided with a cam surface 40 (Fig. 3) acting upon depression of a key to move a slide 41 forwardly thereby operating a bell crank lever 42 raising roller 43 of said lever out of engagement with a suitable opening in a spring operated slide 44 (Figs. 3 and 15). Slide 44 is provided with a lug 45, which, upon depression of an operating key and subsequent forward operation of slide 44, engages the upper arm of a pivoted latch 112, thereby releasing said latch from clutch control lever 106, whereupon said lever will be moved counter-clockwise by its spring 89, and an insulation roller 109 on said lever will act to close a switch 110 in the circuit of the electric motor. In this movement the lower end of lever 106 will be disengaged from the tail of the spring urged clutch pawl 103, and allow said pawl to fall into engagement with the driving clutch member 104 to effect a machine cycle of operation.

During a cycle of operation the wheels of the accumulators 473 are rotated substractively upon the forward stroke or additively upon the return stroke of the actuators 610, there being an actuator lever 610 and an associated accumulator wheel for each order provided in the machine, the timed meshing and unmeshing of the accumulator gears being controlled as follows, and as more fully described in U. S. Patent 2,055,623, granted September 29, 1936, to Loring P. Crosman and entitled "Calculating Machine," to which reference is made for more detailed description.

As shown (Fig. 2), the accumulator pinions 472 stand normally in mesh with the segment gears of actuators 610, the accumulator shaft 403 being mounted in guide slots (Fig. 11) of the machine frame so that the accumulator assembly may be moved radially of the actuators, to mesh and unmesh the pinions 472. Shaft 403 is adjusted by means of toggle linkage 10, one member of which is fast upon a rock shaft 2. The linkage is held in either of two adjusted positions by a toggle spring 11. Fast upon shaft 2 is a plate 419 (Fig. 3) having yieldable spring connection 4 with an arm 5 provided with a lateral flange 22. Pivoted at 33 upon said arm is a cam switch 6 which, with flange 22 of arm 5, lies in the plane of a roller 7 fixed upon lever 316.

In additive operations roller 7 will contact cam surface 21 of switch 6 and thereafter with the rear end of flange 22, whereby arm 5 will be raised, thus rocking shaft 2 and linkage 10, to unmesh the pinions 472 of the accumulator before the actuators are allowed to move. During the continued forward movement of actuators 610, arm 5 will be held in raised position by engagement of roller 7 with the lower surface of flange 22. At the end of the forward stroke, roller 7 will lift the forward end of switch 6 away from a lug 20 of arm 5, and will thereafter move out of contact with the switch, which will return under influence of a spring 75 into normal relation with the arm. Upon the return stroke of the operating mechanism, roller 7 will engage a cam surface 23 of switch 6, restoring arm 5 and the parts 419, 10, and 403 to original position, remeshing the pinions 472 with the segments 610 to effect the registration.

The forward movement of slide 44 to engage the clutch also serves to lock any of the operating control keys in their depressed position, by engagement of said slide with a shoulder 46 of the key stems, thus holding the key in depressed position until restoration of slide 44, as hereinafter explained. Near the end of a cycle of operation of the machine, and after actuators 610 have been brought to rest, well known means release the set digit keys 215 and the depressed operation key disengages the clutch and restores the various control elements to normal position. For this purpose an anti-friction roller 65′ mounted on a lever 65 (Fig. 4) will be engaged by a cam projection of plate 105, and rocked clockwise against tension of a spring 66 secured at one end to lever 65 and at its other end to a fixed framing of the machine. A pivoted lever 67 has yieldable connection with lever 65 through means of a spring 68, lever 67 extending upwardly and into the path of movement of the lug 45 of slide 44. Displacement of lever 65 by the cam edge of plate 105 will therefore retract slide 44 to and rearwardly beyond its normal position of rest, the extra rearward movement being utilized to clear the digit keyboard as fully set forth in the reference patents. Retraction of slide 44 will also unlock the operation keys and will allow roller 43 to again fall into latching engagement with said slide.

In the above described restoral of slide 44, the projection 45 will permit latch 112 to fall and rest upon the projection 106′ of latch 106. Near the end of the clockwise movement of lever 65 a projection 65″ thereof engages and rocks lever 106 into the path of movement of clutch pawl 103 to disengage said pawl from driving member 104, whereupon latch 112 re-engages projection 106′ terminating the cycle of operation.

Figure 12:
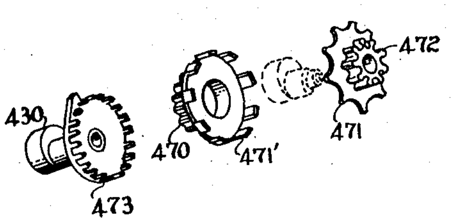
Fig. 12 is an exploded perspective view of a numeral wheel unit of the crawl carry accumulator.

Each numeral wheel unit is connected to the higher order numeral wheels by tens transfer mechanism of the "crawl" carry type such as described in U. S. Patent 1,828,180 issued to Clyde Gardner on October 20, 1931. As shown in Fig. 12 each numeral wheel unit includes a pinion 472 adapted to be brought into mesh with the segment of the arms 610, this pinion being coupled by engagement of members 471—471′ with a floating gear 470. Floating gear 470 engages the internal gear teeth of numeral wheel 473 and is mounted upon an eccentric 430, fast upon a sleeve extending from the adjacent right hand or lower order numeral wheel. Movements imparted to pinion 472 are transmitted to numeral wheel 473 by rotary movement of floating gear 470, and at the same time rotation of cam 430 will carry the next higher order floating gear 470 in an orbit within the teeth of its numeral wheel gear 473, resulting in a movement of this higher order numeral wheel of one-tenth the extent of movement of the lower order wheel. For further description of the tens transfer mechanism, reference is made to the foregoing Gardner patent.

*Printing*

Figure 2:
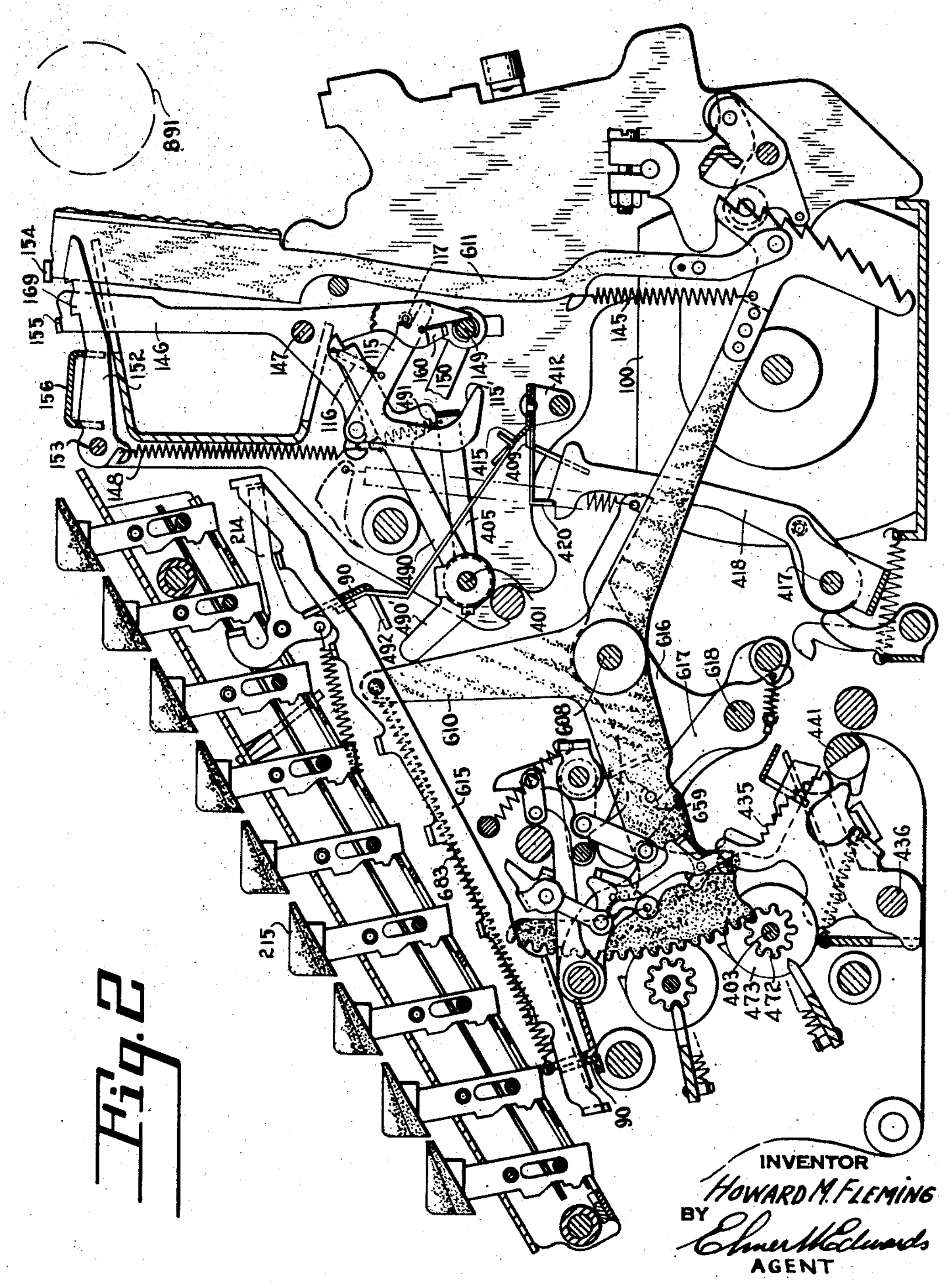
Fig. 2 is a section taken substantially on line 2—2 of Fig. 1, showing the keyboard, registering and printing devices.
Figure 5:
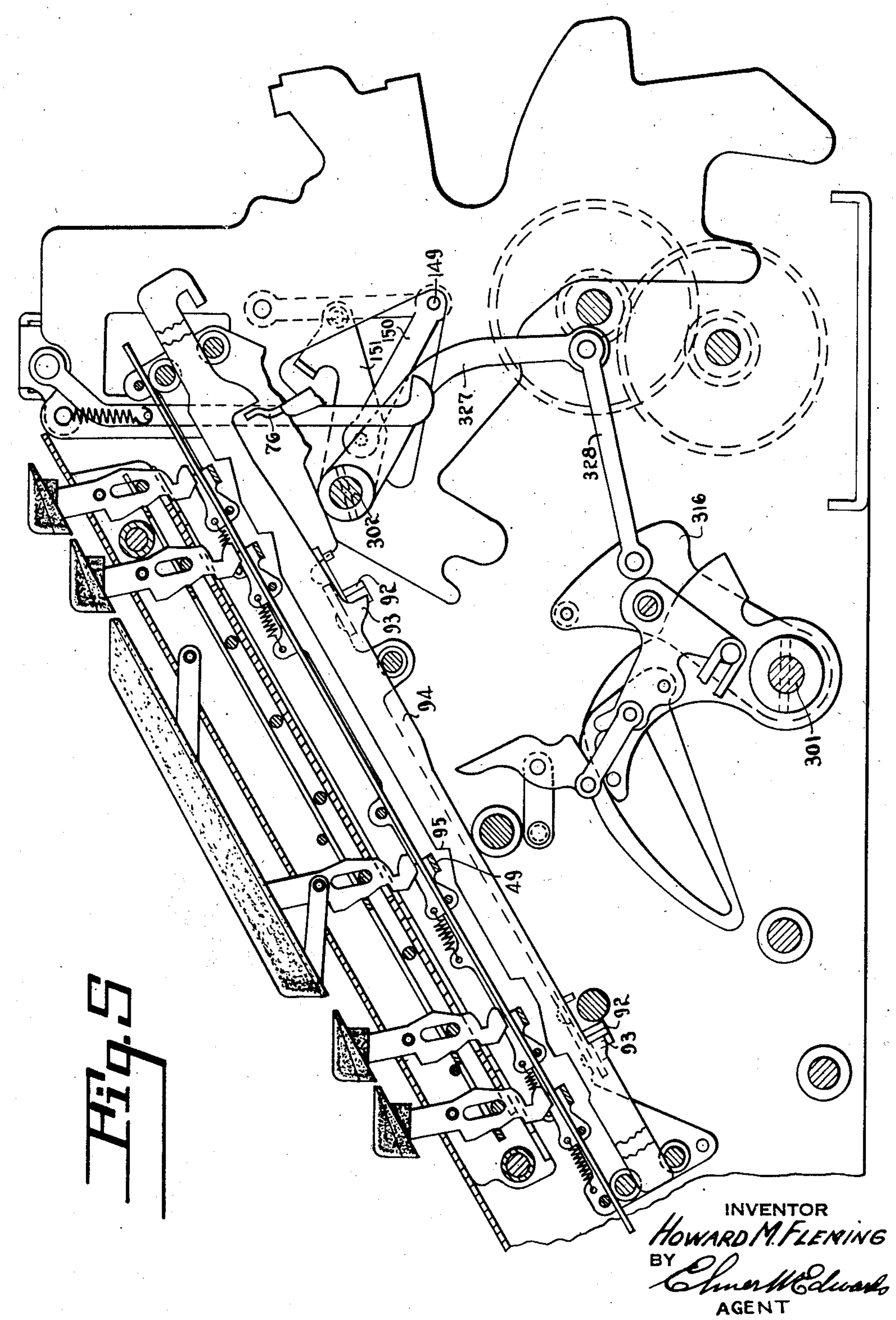
Fig. 5 is a right hand elevation showing the slide for controlling shifting the index blades, and a part of the power train for the printing and line spacing devices.

Printing is effected during a cycle of operation upon a record sheet which is inserted around the usual platen 891 mounted within the framing of the carriage in the well known manner. The digit type is solidly set in the type bars 611, and these type bars are normally held in forward position substantially spaced from the platen 891 by means of springs 145 (Fig. 2). Adapted for engagement with the forward face of each type bar 611 is a hammer 146, mounted upon a shaft 147 fixed in the machine frame. The hammers are operated by means of their respective springs 148, and are normally held tensioned by means of a bail 149, suspended from shaft 147 and connected by a link 150 with a rock arm 151 (Fig. 5). Arm 151 is fast upon a shaft 302 upon which is also fast an arm 327 having link connection 328 with the motor driven arm 316. Thus upon motor operation, and during the counterclockwise rotation of frame 616, shaft 302 will be rocked clockwise and bail 149 moves forward slowly permitting any of the hammers 146 which are to be inactive relative to printing to rotate gradually therewith in a clockwise direction until the type bars 611 are forced to a position, wherein the type at the printing line will be closely adjacent to the surface of platen 891. Bail 149 is held in this position during the printing operation, effective in the active orders as hereinafter described, and is subsequently returned to restore the hammers to normal position. This is the entire operation of any of the hammers 146 located in columns to the left of those wherein keys 215 have been depressed.

Action of the hammers 146 in the active columns is controlled as follows:

A series of latches 152 (one for each hammer 146) is provided, the latches being pivotally mounted upon a shaft 153, fixed in the machine framing, and being urged counterclockwise to latching position by the springs 148, which connect the latches 152 and the hammers 146. Each latch 152 lies beneath a lug 154 of the related type bar 611, and in the normal position of rest of the type bars the latches are held out of engagement with lugs 155 of the hammers by means of a bail 156 supported from shaft 153 and extending across the top edge of the latches. Pivotally secured to the left end of bail 156 is a downwardly extending arm 161 (Fig. 6) provided with a laterally extending lug 162 underlying the projection 163 of a lever 164 loosely mounted upon the left end of shaft 147. Lever 164 is provided with a cam slot 166 embracing a roller 167 fast to an arm 168 secured to the power operated shaft 302 and adapted in its normal position of rest to hold bail 156, and thereby latches 152, in depressed position.

During the clockwise movement of shaft 302 previously described, arm 168 will be rocked downwardly and roller 167 will impart a counterclockwise motion to cam lever 164 to release bail 156, permitting said bail to be rocked upwardly under influence of a spring 159, and the latches 152 will also be permitted a limited upward movement, under influence of their respective springs 148, until stopped by engagement with the projections 154 (Fig. 2) of the related type bars 611. Upon rotation of an actuator 610, however, and consequent displacement of a type bar 611, the lug 154 of said bar will be moved upwardly away from its related latch 152, which latch will thereupon continue further its upward movement until stopped by engagement with the lug 155 of its related hammer, in which position a shoulder 169 of latch 152 is in the path of movement of lug 155 of the hammer. The engagement of latches 152 with lugs 155 is timed to occur before any substantial movement of the hammers is allowed by bail 149, previously described.

Arm 161 is provided with a depending hook 157 (Fig. 6) adapted to be engaged near the extreme forward movement of the actuator drive by a lug 158 of arm 151, depressing bail 156, thereby releasing latches 152 from engagement with the hammers 146. Thereupon hammers 146 will be violently operated by their springs 148, imparting sufficient momentum to the type bars 611 to insure printing engagement of the type with the record sheet material supported on platen 891.

Figure 16:
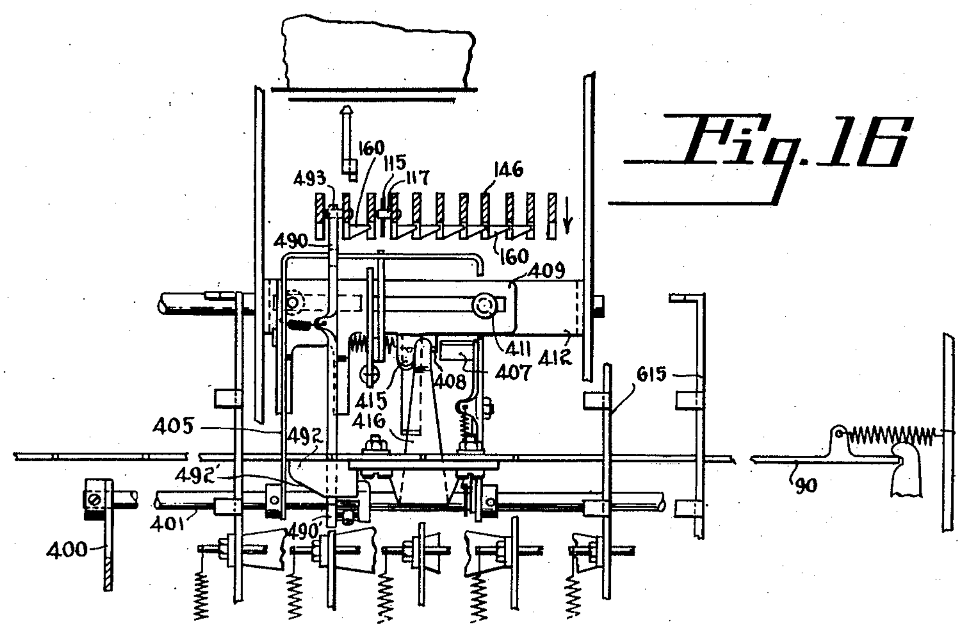
Fig. 16 is a fragmentary plan view of the means for determining the order from which an overdraft control is to be effected.

In order to effect printing of zeros by the type bars to the right of those displaced by the actuators 610, the value printing hammers are provided with overlapping lugs 160 (Figs. 2, 6 and 16) which will hold in spring charged condition the hammers located to the right of one secured by its latch. In other words a latch 152, upon movement of bail 156, will release its related hammer 146 and all hammers lying to the right thereof, for printing operations.

It is to be noted, however, that the projection 160 for the 8th order column hammer is removed and a pivoted latch 115 substituted therefor, held in engagement by spring 116 with a pin 117 fast to the adjacent lower order hammer. Latch 115 serves the function of projection 160 during operations when setting lever 400 is in forward position, but is disengaged from pin 117 when lever 400 is moved to rearward position to split the printing means, as will more fully be described in connection with statement printing.

Suitable line spacing means operable by reciprocatory movement of an arm 396 (Fig. 7), having drive connections (not shown) with the power shaft 302, are provided as fully set forth in reference Patent 1,915,296.

*Total and sub-total*

As well known and fully set forth in the reference patents, in machines of this type, totals are printed by first disengaging the actuators 610 (Fig. 2) from their column latches 214 and thereafter from the frame 616 by tripping dogs 617 in successive order from right to left, allowing the racks to move subtractively under influence of their springs 683 to rotate the accumulator wheels to zero, in which position the wheels are held by engagement with appropriate stops. Following this, the cycling of the machine will effect operation of the printing means at the end of the forward stroke of the operating means and hereafter frame 616 will pick up and return the actuators to normal position. Successive release of the racks 610 is essential because of the character of the tens transfer mechanism employed between the accumulator wheels, i. e. the "crawl" carry type, wherein every unit of movement of a lower order wheel transmits one-tenth of a unit of movement to the next adjacent higher order wheel. Therefore, in zeroizing, as each lower order wheel is returned to zero, it will subtract from the higher order wheel the fractional movement previously transmitted.

The above and other special functions are effected upon depression of the total key 278, under control of various spring slides 74, 81 and 94 (Fig. 14) lying beneath pivoted bails 49, depressible by their related machine operating key to control the extent of forward movement of said slides, as will now be described.

Depression of total key 278 will release slide 44 (Fig. 15) to start motor operation, as previously described for the other keys, and will permit a full movement of the slide 74 (Fig. 3) to set the operation control means 6 for substractive operation, that is to say, the accumulator pinions 472 will be left in mesh during the zeroizing operation, and will be unmeshed before the additive stroke of the actuators 610 is effected.

In the present instance, it is desired to effect the various adjustments of the controlling mechanisms by power from the motor, and consequently upon depression of the total key the clutch will be allowed a limited driving movement, during which the stop bars 615 will be moved laterally free of the column stops 214, as described more fully later, and then the motor operation will be interrupted to give time for the completion of the zeroizing operation, at the conclusion of which the clutch will be re-engaged and the cycle of operation completed. For this purpose a slide 81 (Fig. 4), which is blocked against operation when bails 49 related to other operating keys are depressed, will be allowed to operate, i. e. move forward, upon depression of the total key, under influence of spring 82. Slide 81 is pivotally connected with a link 83 having pin and slot engagement with a latch 84.

Forward movement of slide 81 is effected simultaneously with forward movement of an arm 76 (Fig. 3), oscillated during each cycle of operation of crank arm 105, and link 83 is moved downwardly, tensioning a spring 85 which then tends to move latch 84 clockwise about its pivotal support. The free end of latch 84, however, engages a spring pressed arm 86, pivoted upon the machine frame and having an anti-friction roller 86' engaging the cam edge of plate 105. During the first part of the cycle of operation, the roller 86' of arm 86 will ride to and beyond the high point of the crank 105, as the latter rotates, rotating arm 86 clockwise and allowing latch 84 to fall into a notch formed in the upper end of said arm, to maintain the arm in rocked position. A rearward extension 87 of arm 86 is thus held by latch 84 in the path of rotary movement of the clutch pawl 103. Engagement of the pawl with extension 87 serves to disengage the pawl from the driving member 104 of the clutch and to hold it in disengaged position.

The slide 81 also has link connection 88 with an arm 134, pivoted upon a transverse rod 135 mounted in the right and left machine frames and provided with a finger 133 which is brought during the movement of slide 81 into contact with a stud 350 fixed in a lever 351 fulcrumed at 352 upon a support arm 353 pivotally mounted on a shaft 354 supported within suitable fixed framing of the machine.

Engagement of finger 133 with stud 350 will impart clockwise movement to lever 353, about shaft 354, to effect operation of the successive zeroizing devices as more fully set forth in Patent 2,261,341 issued November 4, 1941, to Loring P. Crosman.

When the highest order accumulator wheel is rotated to its zero position, the zeroizing means imparts clockwise movement through suitable link connection (not shown) to a transverse shaft 379 (Fig. 4) upon the right end of which is an arm 380. Arm 380 is provided with a projection 381, adapted in said movement to engage the lower end of latch 84 and rock said latch out of restraining engagement with arm 86. Arm 86 is thereupon rocked counterclockwise by its spring 89 out of engagement with clutch pawl 103, permitting said pawl to re-engage clutch member 104 to restart the interrupted cycle and effect a printing operation in the manner as previously described.

As set forth in reference Patent #2,330,270, in order that the keyboard may be free for the setting up of an item during any portion of the totaling operation, the index bars 615 are designed to be shifted laterally out of position of engagement with the key stems.

The index bars 615 are supported near their ends in sliding plates 90 (Figs. 2, 7 and 14) urged toward the right side of the machine by springs 91. The ends of the bars are engaged by a pair of bell crank levers 92, these levers being provided with shoulders engaging projections 93 of the slide 94 (Fig. 5). Slide 94 lies parallel to the slides 74 and 81, and is likewise reciprocated by the operation of lever 76, being moved toward the front of the machine under influence of the springs 91 acting through bell cranks 92. In add, subtract and non-add operations, bails 49 of the add, subtract, and non-add keys are depressed into position in front of suitable notched shoulders 95 cut in the slide 94, to prevent operation thereof. Normally the lever 76 (Fig. 3), through slide 94, will serve to hold the index bars 615 in normal relation to the digit keys 215 and to the zero latches 214 as seen in Fig. 14. Upon forward movement of lever 76 and slide 94 therewith, springs 91 will move plates 90 and index bars 615 toward the right, out of position of contact with the keys and also out of contact with the zero latches 214. The plates 90 operate individually, so that there can be no jamming of the parts due to twisting action.

In order that amounts set on the keyboard will not be cleared during the totaling operation, the bail 49 of the total key is provided with an extension 96 (Figs. 3 and 15) which will be held by the key in position to engage a shoulder 97 of slide 44 and prevent movement of said slide rearwardly beyond its normal position, thus preventing the keyboard clearing previously described.

Sub-total key 273 operates precisely in the manner of total key 278, except that slide 74 is held in a partially operated position by engagement of the bail 49 related to the sub-total key with a shoulder 77 of the slide. Thus switch 6 is held in position for a non-add operation whereby the total subtracted from the accumulator wheels is restored thereto during the return stroke of the operating mechanism, all as well known in the art and described in the reference patents.

*True negative totals*

Overdraft control devices are provided wherein a movement of the highest order (9th column) actuator lever 610 from its 8 to 9 index position will control the means for converting a negative total (registered as the complement of a true negative total) to a true negative total registration and thereafter printing it as such.

Whenever a negative total value has been accumulated upon the register wheels 473, a successive zeroizing operation of the register wheels will include a complemental nines registration carried up to the highest order wheel, and a movement of the highest (9th column) order actuator 610 with its type bar 611 to the nine digit printing position will be utilized to set the true negative total devices into operation in the manner similar to that as set forth in Patent 1,915,296 issued to Loring P. Crosman, June 27, 1933.

As described in said patent, the method of converting a complemental negative total to a true negative total involves three subtractive cycles of motor operation and two total setting actions of the zeroizing devices.

A set of stops 435 (Figs. 2 and 7) yieldably engaging the segments 610 are locked in position as adjusted thereby, in accordance with the complemental registration and the segments 610 are thereafter restored idly to normal position. The segments are now again released and will be stopped by the stops 435, the accumulator 473 being meshed during this subtractive stroke of the segments, whereby the complement is subtracted from zero, giving a registration of the true negative total. The segments 610 are again restored idly to normal position by a cycle of operation of frame 616, and the stops 435 are released, so that a second zeroizing operation will now transfer the true total to the type bars. The printing of the total, which normally occurs at the end of the first total setting operation has in this case been delayed, and will occur after the true total is set.

A manually settable lever 400 (Fig. 1) in its forward position provides for overdraft control by the left hand (9th column) actuator rack 610.

Lever 400 is fast to a shaft 401 (Fig. 6), suitably journaled within the framing of the machine, and is held in either its forward or rearward adjusted positions by means of a spring tensioned click pawl 402.

Pivotally mounted at 404 upon a rearwardly extending bail 405, fast to shaft 401, is a pawl 406 provided with a projection 407, adapted when lever 400 is in forward position, to be held in raised position with bail 405 so that said projection will lay in the path of rightward movement of the projection 408 of a slide 409. Slide 409 is urged toward the right by a spring 410 and is mounted by pin and slot connections 411

(see also Fig. 7) upon a rock plate 412 loosely mounted upon a transverse shaft 413. Normally, slide 409 is held in its leftward position, wherein a lug 414 on the forward edge of said slide will be positioned in the path of movement of the highest (9th) order actuator rack 610. This is accomplished by engagement of a projection 415 of said slide with a finger 416 fast to the rear support frame 90 for the index bars 615. It will be recalled that frames 90 during a totalizing operation are moved toward the right to carry the index bars 615 out of cooperative position relative to a depressed key stem. Thus frame 90 will carry finger 416 away from projection 415; however, with lever 400 in forward set position, projection 408 of said slide 409 will engage projection 407 of the pawl 406 to hold slide 409 in its leftward position, so that the overdraft control will be effected from the 9th column rack arm 610 to cause operation of the negative total devices hereinafter described.

Figure 7:
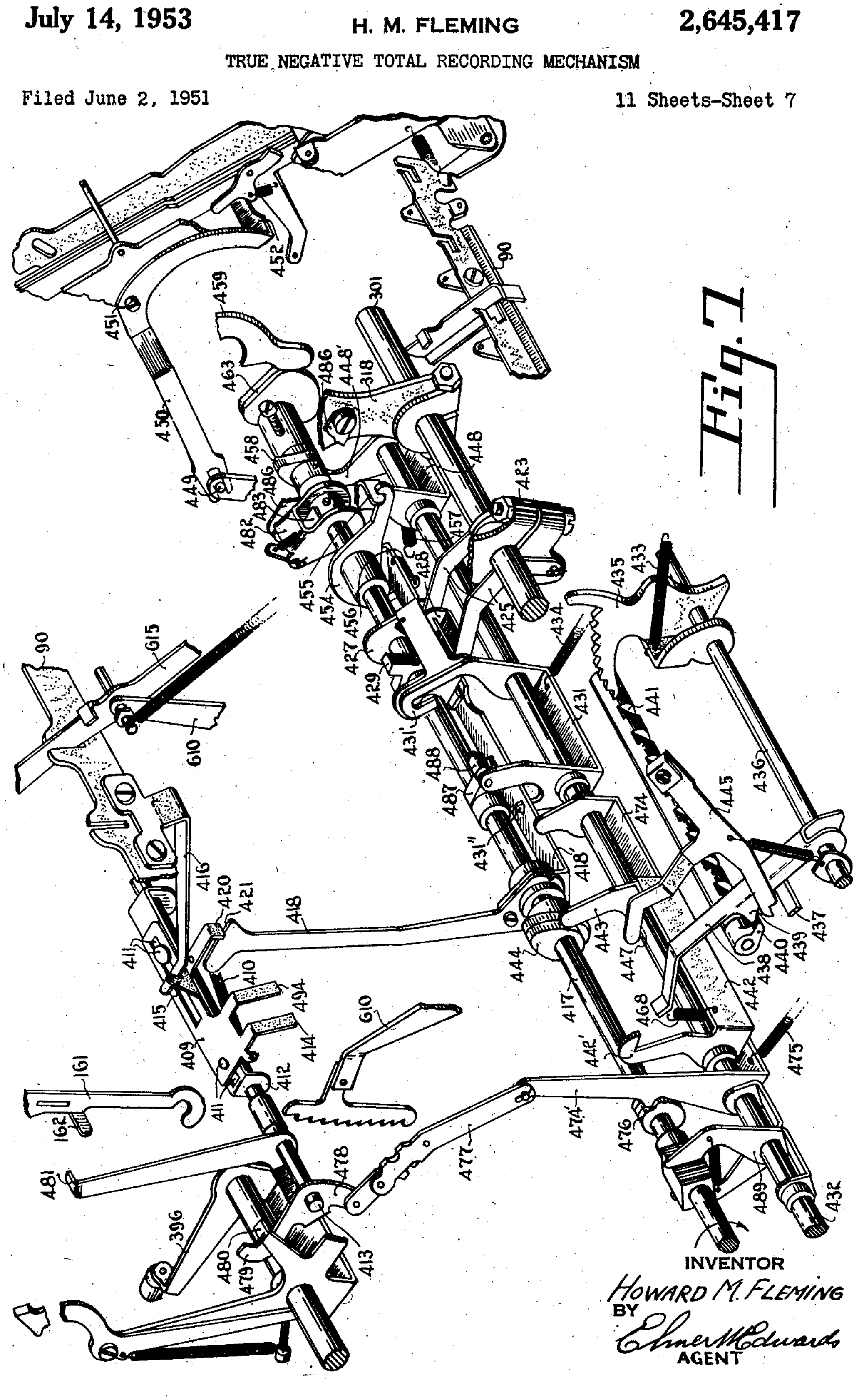
Fig. 7 is a left hand perspective showing the means for converting a complemental total registration to a true negative total registration.

Loosely mounted upon a transverse shaft 417, suitably journaled within the left and right hand frames of the machine, is a lever 418, the lower end 418' of which is bent toward the right and then upwardly and around shaft 417. Lever 418 is latched in counterclockwise position as seen in Fig. 7 by the engagement of a projection 420 of rock plate 412 with the notched surface 421 of said lever. The 9th order actuator rack 610 in moving frame 8 to 9 index position will engage projection 414 of slide 409 and impart a counterclockwise rocking movement to the plate 412, thereby lifting projection 420 out of engagement with lever 418 and permitting a clockwise movement of said lever. Clockwise movement of lever 418 will set certain control devices for negative total operations, including means for indexing the shaft 417 a quarter of a revolution during a cycle of operation. Fast upon shaft 417 are various cam members which perform certain functions during negative total operations as will be described.

Figures 8, 9, 10:
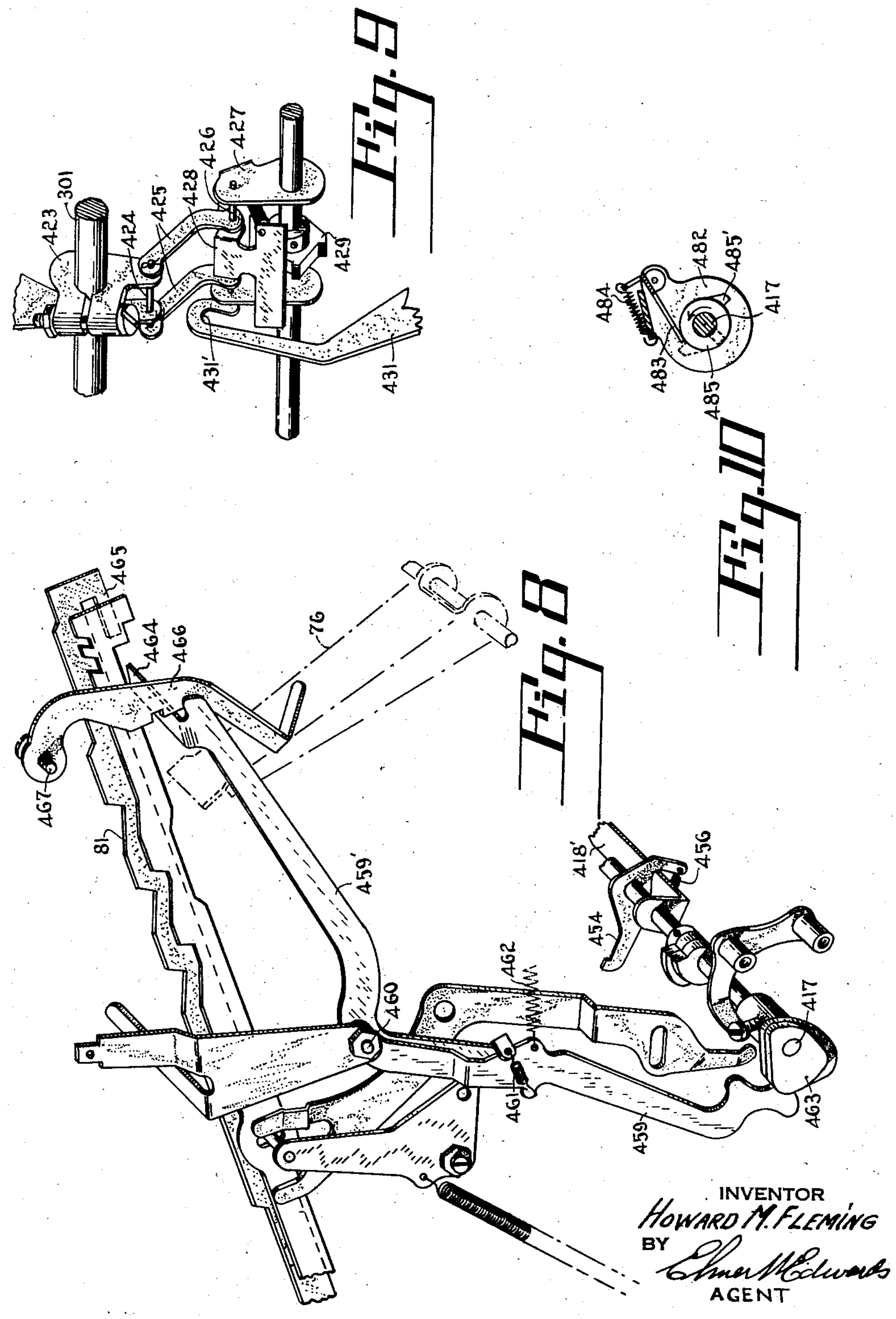
Fig. 8 is a right hand perspective, looking from the rear of the machine, showing control means for preventing a zeroizing operation during the second cycle of a negative total operation.
Fig. 9 is a right hand perspective as viewed underside of the negative total cam shaft indexing means.
Fig. 10 is a detail view of special means for indexing the negative total cam shaft from one-half to three-quarter turn position.

The rock shaft 301, cyclically operable as previously described, has fast thereon a U-shaped arm 423 (Figs. 7 and 9) which supports a rod 424 upon which is pivotally mounted parallel links 425. The opposite end of links 425 are pivotally connected to a rod 426 mounted within the end portions of a lever 427, also U-shaped and loosely mounted upon the cam shaft 417. Fulcrumed on rod 426 is a pawl 428, spring held against the peripheral diameter of a four tooth ratchet wheel 429 secured to the shaft 417. During each machine cycle of operation, a reciprocatory movement is imparted to lever 427 and to pawl 428 about shaft 417. In operations other than when a negative total is to be printed, pawl 428 during this movement will be prevented from engaging with the teeth of ratchet wheel 429 by entering the recessed end 431' of a hook-shaped lever 431. Lever 431 is loosely mounted upon a transverse shaft 432 and is held normally in position to receive pawl 428 by an arm 431'' of lever 431, extending through a suitable orifice of the crossover part 418' of the latched lever 418.

Upon release of lever 418 in a negative total operation, in the manner above set forth, a spring 434 will rock lever 431 clockwise, as viewed in Fig. 7, whereupon the end 431' thereof is moved beyond the path of movement of pawl 428, and said pawl in its return movement during the later half of a machine cycle will engage a tooth of ratchet wheel 429 to impart a quarter turn to the cam shaft 417.

For each order register actuator 610 provided in the machine, there is a stop member 435, loosely mounted upon a transverse shaft 436 journaled within the framing of the machine. Each stop member is adapted for engagement by the forward end of its corresponding order actuator rack arm 610, so that a movement of said racks to register a value and to bring its related type bar to printing position will be imparted to its related stop member 435. During the first zeroizing operation therefor, the rack arms 610 in clearing the register wheels 473 to zero will adjust the stops 435 according to the complemental value accumulated upon the register.

Figure 17:
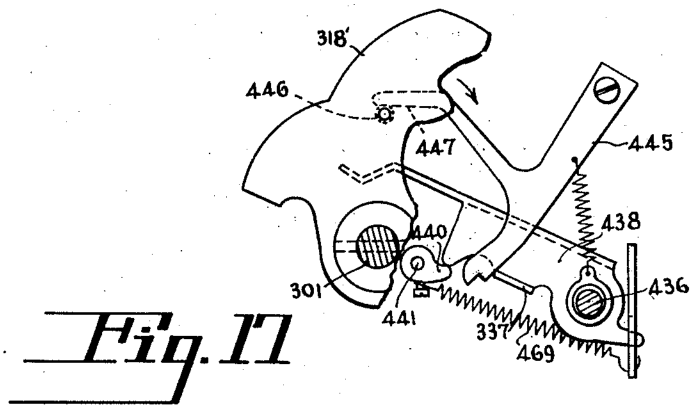
Fig. 17 is a detail elevation of the latch means for holding the adjustable stops in set position.

Near the end of the forward stroke of the first cycle of operation, an arm 318' (Fig. 17) fast to rock shaft 301 will engage the projection 437 of a rearwardly extending lever 438, loosely mounted upon shaft 436, rocking said lever downwardly. A projection 439 of lever 438 overlies an arm 440 fast to a notched shaft 441 (Fig. 7), and in the downward movement of lever 438 will impart a clockwise rotative movement to said shaft to bring the flattened portions thereof into engagement with the serrated edges of stop members 435, thereby locking said members in their adjusted positions.

Loosely supported upon shaft 432 is a frame 442 formed as a hook 442' at its left end and provided with an arm 443 at the right end positioned in the path of movement of a cam member 444 fast to the cam shaft 417. During the first quarter turn of shaft 417, in the return stroke of the first operating cycle, cam 444 will rock hook 442' of frame 442 into engagement with arm 438 to latch said arm in depressed position, thereby locking the stops 435 in their adjusted positions, until subsequently released during the return stroke of the second cycle of operation as will be described. A suitable spring tensioned latch 445 will engage projection 437 of lever 438, as said lever is rocked downwardly at the end of the forward stroke of the operation to hold said lever in depressed position while the engagement of hook 442' therewith is being effected in the return stroke. Latch 445 is thereafter disengaged from projection 437 at the end of the return stroke of rock arm 318' (Fig. 17) by means of a pin 446 in said arm engaging the cam surface 447 of said latch.

It will be recalled that near the end of a cycle of operation, the crank arm 105 (Fig. 3) acts through bell crank 76 to restore the various operating control slides 74, 81 and 94 to their rearward positions, and that said crank arm through bell crank 65 (Fig. 4), spring 66 and lever 67 also restores operating slide 44 to permit re-engagement of latch 112, with clutch lever 106 to terminate a machine cycle of operation. Also, restoration of slide 44 to and beyond its normal rearward position acts to clear the keyboard including a depressed operating key.

So that the machine may continue in cycles of operation, the slide 44 is caused to be latched in forward operating position until the end of the third or printing cycle of operation as follows.

Loosely mounted upon shaft 432 (Fig. 7) is a U-shaped lever 448, one end of which has pin and slot connection 449 with a lever 450 fulcrumed to the framing at 451. Lever 450 is provided with a lug 452 normally held in a lowered position out of the path of movement of a projection 453 (see Fig. 13) of the operating slide 44 through means of a latch 454 (Fig. 7) having engagement with a lug 455 of lever 448. Latch 454 is loosely mounted upon shaft 417 and is held in engagement with lug 455 by a spring 456 connected between said latch and the cross member 418' of lever 418 (see also Fig. 8). Upon a clockwise movement of lever 418, previously described, the rearward edge of crossover 418' will rock latch 454 out of engagement with lug 455, permitting a clockwise movement of lever 448 (as seen in Fig. 7, counterclockwise in Fig. 4) by its spring 457 until stopped by the engagement of end 448' of said lever with the lower peripheral diameter of a cam 458 fast to cam shaft 417. The above movement of lever 448 rocks lever 450 to carry lug 452 upwardly into the path of return movement of projection 453 (Fig. 13) of slide 44 to thereby prevent a return movement of the slide, and the total key will thus remain in its depressed position. Also, the relatching of clutch lever 106 by latch 112 is thereby prevented and lever 106 under influence of its spring 107 rocks out of the path of cyclic movement of clutch pawl 103 before engagement of said pawl with lever 106 can be effected. This permits a second cycle of operation during which slide 74 again conditions the operation control means for a subtractive operation.

To prevent a tripping of the zeroizing devices during the second cycle of operation, the control slide 81 (Figs. 4 and 8) will be held in returned rearward position as follows.

Figure 4:
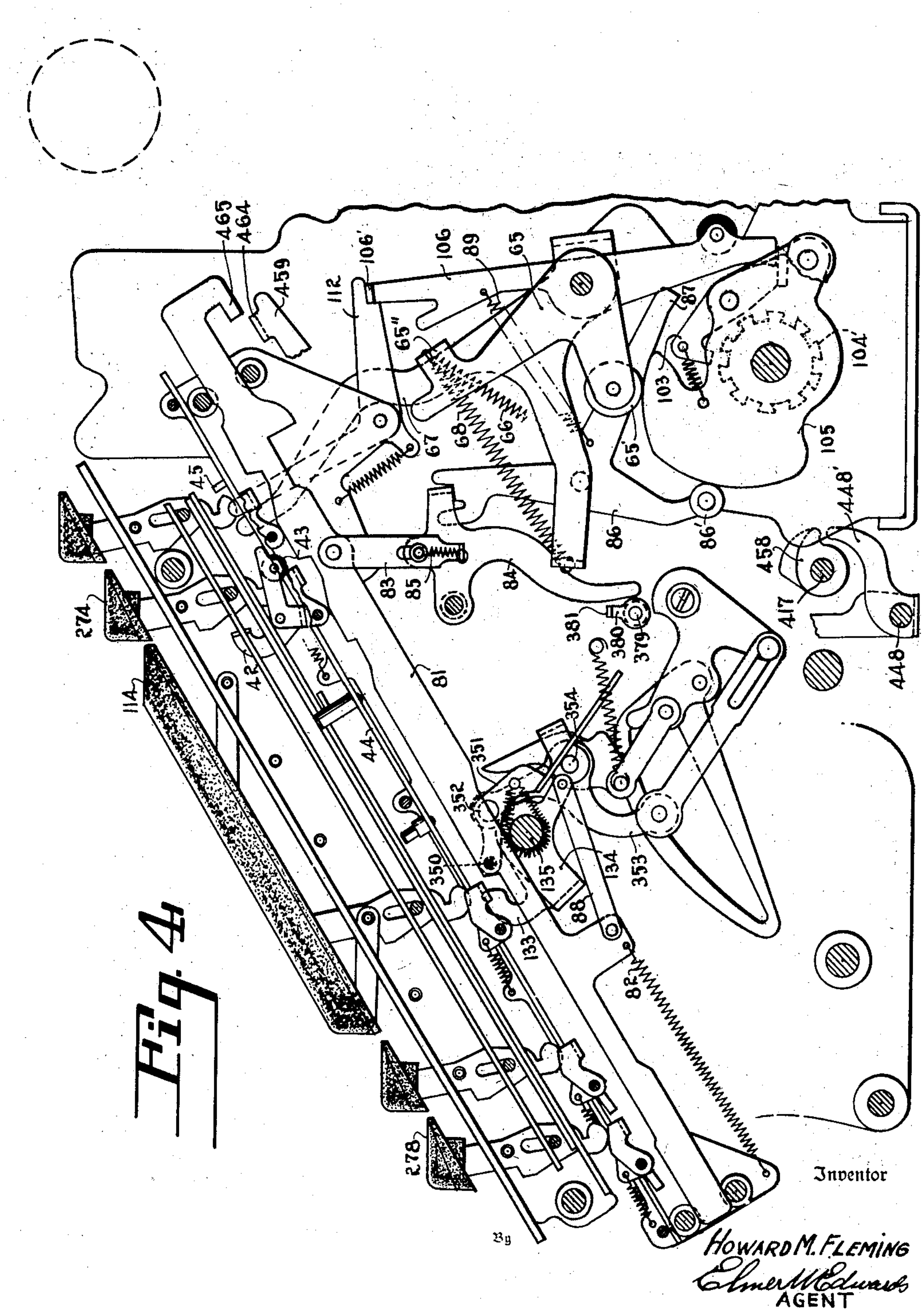
Fig. 4 is a right hand elevation showing the accumulator zeroizing slide and associated total taking mechanism.

A bell crank lever 459 (Fig. 8) is fulcrumed at 460 upon the right hand frame of the machine, and is held against a counterclockwise urge of its spring 462 through contact with the largest peripheral diameter of a cam 463 fast to the shaft 417. The rearward arm 459' of bell crank 459 is provided with a lug 464 which extends beneath the zeroizing control slide 81, and is normally held by cam 463 in a downward position out of the path of forward movement of a projection 465 formed on the underside of the rearward end of said slide as shown in Fig. 4.

Indexing of shaft 417 one quarter turn during the first cycle of machine operation, however, will rotate cam 463 bringing an intermediate peripheral diameter surface of said cam opposite bell crank 459, which will permit of partial movement counterclockwise thereof and, as cam 105 subsequently restores slide 81 to its rearward position, the lug 464 will first engage the under surface of projection 465, and thereafter will raise into position to block a forward movement of projection 465, thus holding slide 81 in its rearward position during the second cycle of machine operation.

During the second cycle of operation, rack arms 610 are limited in their forward movement by the stops 435, as earlier set forth, and will subtract the complemental value stored in said stops from the cleared register, thereby leaving a true negative total value stored in the register. On the return movement of the second cycle of operation, cam shaft 417 will again be indexed by pawl 428 a quarter turn to thereby condition the parts for a third cycle, during which cycle a totalizing operation is again initiated to clear the register and cause the true negative total value stored therein to be printed upon the record sheet as will be described. In the indexing of shaft 417 during the second cycle, cam 463 is rotated and will present a lower peripheral diameter to the lever 459. To prevent a movement of lever 459 which would cause a premature tripping of the zeroizing means by releasing slide 81 at this time, lever 459 is prevented from following the contour of cam 463 by means of a spring tensioned latch 466 pivotally mounted upon the framing at 467 and adapted to engage with lug 464 in the described operated position of lever 459. Near the end of the second cycle, however, the slide restoring lever 76 (Fig. 3) will disengage latch 466 from lug 464 and lever 459 will rock further in its counterclockwise direction to carry lug 464 upwardly of the projection 465, so that slide 81 will be permitted to move forwardly in the third cycle of operation.

Indexing of shaft 417 during a second cycle of operation also rotates cam 444 (Fig. 7) away from arm 443 permitting frame 442, under influence of its spring 468, to rock hook 442' out of engagement with lever 438. Near the end of the cycle, therefore, as latch 445 is tripped by arm 318' as previously set forth, notched shaft 441 will be rocked out of engagement with stops 435 by a spring 469 (Fig. 17), permitting said stops to be restored to their normal zero setting positions by their respective springs 433.

Printing and line spacing will be held in abeyance for the first two cycles of operation as follows.

There is loosely mounted upon shaft 432 a bail 474 (Fig. 7) held in clockwise position against tension of a spring 475 by engagement of the right hand end of said bail with the crossover portion 418' of the lever 418. Upon release and consequent clockwise movement of lever 418, previously described, bail 474 will rock counterclockwise under influence of spring 475 until stopped by engagement of the upwardly extending left end 474' of said bail with the lower peripheral diameter of a cam member 476 secured to shaft 417. Bail 474 has link connection 477 with a U-shaped latch lever 478 loosely mounted upon support shaft 413, and upon counterclockwise movement of bail 474, link 477 moves rearwardly rocking said latch 478 clockwise. Clockwise movement of lever 478 serves to position a projection 479 of said lever into the path of movement of a lug 480 of the arm 396 which operates the platen feed devices, and thereby blocks movement of said arm to prevent a line spacing operation. Also the clockwise movement of lever 478 serves to position a projection 481 of said lever over the lug 162 of the arm 161 to thus hold the printing hammer latch bail 156 (Figs. 2 and 6) in its lower position. The latches 152 for the printing hammers will thus be held out of engagement with the hammers 146, and all the hammers are subsequently permitted to operate slowly in such manner that no printing will occur, as heretofore described.

Indexing of shaft 417 during the later half of the second cycle of operation, however, rotates cam 476, and said cam at this time will restore bail 474 and associated parts 477, 478, removing projections 479, 481 from the paper feed arm 396 and from the printing hammer control arm 161 so that the printing and paper feed devices will be free to operate during the third cycle of operation.

Since clutch operating slide 44 is still latched in its forward clutch releasing position by lever 450, the machine will continue to operate for a third cycle during which the various operating control slides 74, 81 and 94 are again caused to move forwardly and control the character of registration, tripping of the zeroizing means and a lateral adjustment of frames 90 which support the stop bars 615, all as in the manner set forth for the first cycle of operation. Operation of the zeroizing means incident to the third cycle of operation, however, now positions the type bars 611 according to the true negative total value stored in the register wheels 473. Printing and line spacing means is also effective for operation as above set forth and the true negative value is printed upon the record sheet at the end of the forward stroke, and the paper feed devices are operated during the return stroke, in the well known manner previously described.

Special means are provided to index cam shaft 417 a quarter turn to its three-quarter turn position during the forward stroke of the third cycle of operation, following which the regular indexing means will operate on the return stroke to rotate the shaft a fourth quarter turn to its normal position.

Figure 13:
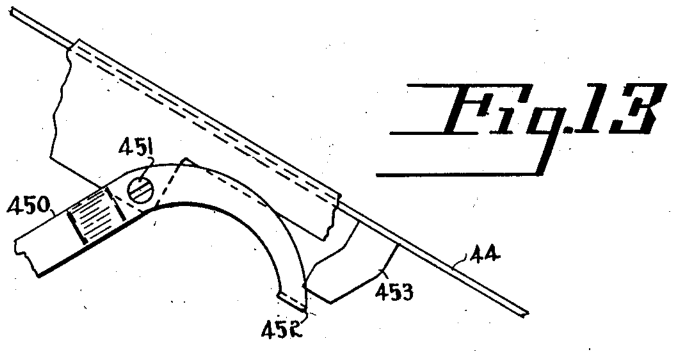
Fig. 13 is a detail view of means for delaying the restoration of a clutch release slide.

Loosely mounted upon shaft 417 is a U-shaped lever 482 (Figs. 7 and 10) within the end supports of which is pivotally mounted a pawl 483 held by means of spring 484 against a one tooth ratchet wheel 485 fast to the shaft 417. Lever 482 has link connection 486 with the power operated arm 318, so that during a forward movement of said arm the lever 482 will carry pawl 483 in an arc around wheel 485, equivalent to one-quarter turn, and thereafter is returned during the return movement of arm 318. The tooth 485' of ratchet wheel 485 is normally in the position illustrated in Fig. 10 out of cooperation with pawl 483 during the first and second cycles of operation. At the end of the second cycle, however, shaft 417 having been rotated a half revolution, the tooth 485' will have passed under pawl 483 and will be in the position illustrated by dotted lines. During the forward stroke of a third cycle therefore, pawl 483 will engage tooth 485' and rotate shaft 417 from its half to a three-quarter rotated position. During this movement of shaft 417, a higher peripheral diameter of the arm 453 (Fig. 4) is positioned opposite lever 448 and rocks lever 448 clockwise to thereby restore lever 450, disengaging the projection 452 of said lever from the projection 453 of operating slide 44 (Fig. 13). Slide 44 is now free to be subsequently returned to its rearward position during the return stroke of the cycle, and permit re-engagement of the latch 112 with clutch lever 106 to stop the machine at the end of the cycle as earlier described.

During the operation of shaft 417 by pawl 483, the cam 463 (Fig. 8) rocks the lower part of lever 459 flexing the spring 461, and as control slide 81 is subsequently restored to rearward position by lever 76, projection 465 is carried rearwardly of lug 464 and, upon release of latch 467 by lever 76, spring 461 restores the lever 459' to its normal position wherein lug 464 is again positioned below the path of movement of projection 465.

In the manner previously set forth, shaft 417 is now again indexed on the return stroke of the machine a quarter turn to thereby complete one revolution and is again in its normal or starting position. During the final quarter operation of shaft 417, a cam 487 secured thereon will wipe past roller 488 of lever 431, restoring said lever and, through projection 431'', the overdraft control lever 418 to their normal positions, wherein lever 418 will again be re-engaged with latch 420, and holds lever 431 in the position to prevent operation of shaft 417 by the indexing pawl 428. Restoral of lever 418 will also permit re-engagement of latch 454 with lug 455 of lever 448 prior to the release of said lever from the high part of cam 458. Also lever 418 will re-engage with lever 474 prior to the release of end 474' of said lever from the high part of the cam 476, and all parts are now again at their normal position of rest. A suitable spring tensioned locator means 489 is provided as shown in Fig. 7 to hold shaft 417 in each of its indexed positions.

*Statement printing*

Adjustment of lever 400 (Fig. 6) to rearward position will condition the machine, as later described in detail, from a normal full capacity condition to a date-statement printing condition wherein dates may be set into the keyboard and printed automatically when listing each debit and credit item.

To avoid a printing of zeros to the left of the highest significant digit value related to item printing, which would otherwise occur when a date printing is effected, lever 400 in statement printing position will effect a printing split between the date printing hammers and the item printing hammers.

Also, since it is undesirable to print an accumulation of date settings, means are provided in the adjustment of lever 400 to rearward position for preventing operation of the date printing hammers in a totalizing operation.

In the listing of numerous items and their dates, it might occur, unless otherwise provided, that the portion of the register related to dating would accumulate date settings beyond the plus accumulating capacity of the register, and thereby in a totalizing operation cause an operation of the negative total devices. This might also occur when a date setting is entered subtractively with a credit item entry. Either operation would cause a plus total item value to be registered as a complement. To prevent such action means are provided in the adjustment of lever 400 to rearward position, for disabling the normal full capacity overdraft control means. However, credit item value totals are to be printed upon the statement sheet as true negative totals; therefore, adjustment of lever 400 to statement printing position will place the overdraft means under control of the register actuators limited to that portion of the register used for accumulation of item values.

*Printing split*

As earlier set forth, the printing hammers 146 which are to the right of any order hammer in which a significant digit value is to be printed are adapted to be held by the usual overlapping tails arrangement in their spring charged condition, so that said hammers may be subsequently released for the purpose of printing any zeros occurring to the right of a significant digit value. To avoid printing zeros in the intervening orders between a date printing and an item value printing, the adjustment of lever 400 to rearward position rocks bail 405 (Figs. 2 and 6) downwardly, whereupon said bail engages cam surface 115' of the latch 115, which is pivoted to the right hand date printing hammer as previously described, and rocks said latch out of engagement with the pin 117 secured to the left hand (7th order) item printing hammer. This disengagement effects a "split" between the 8th and 7th column printing hammers whereby the hammers to the left of the split will exercise no control over the hammers which are to the right of the split. Thus the hammers 146 lying between the date (8th order) hammer and that of the highest order of the item printing column, in which a type bar 611 has been displaced, will be permitted to move forwardly slowly during a machine cycle to their inactive printing position, in the manner as previously described.

*Date hammer block in total printing*

Figure 6:
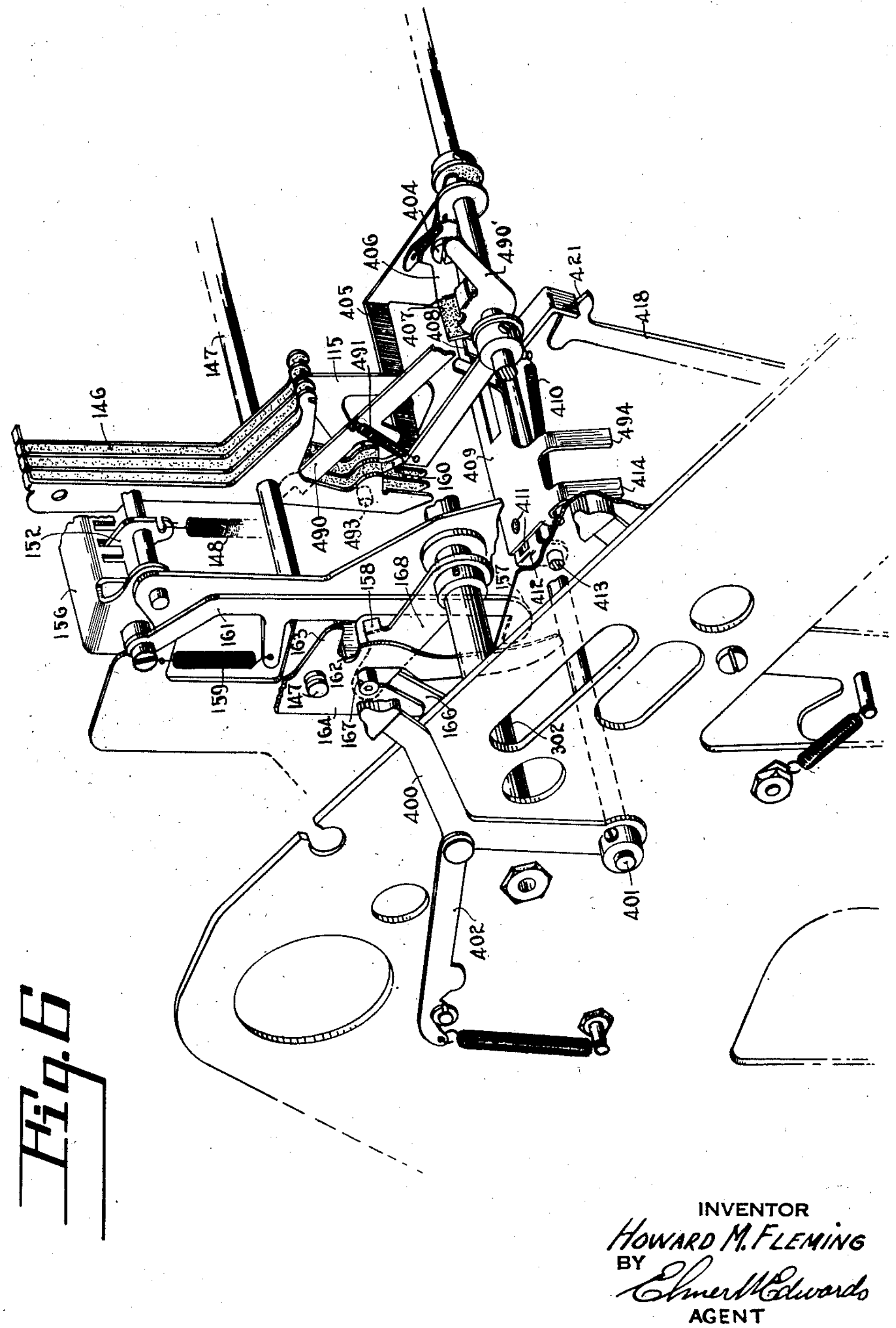
Fig. 6 is a fragmentary left hand perspective of the printing means, and showing the settable means for determining the order from which an overdraft control is to be effected.

Loosely fulcrumed on shaft 401 is a rearwardly extending latch 490 normally held in its raised position, as shown in Figs. 2 and 6, by the bail 405 when lever 400 is in its forward position. A rearward setting of lever 400, however, rocks bail 405 downwardly, as previously set forth, whereupon latch 490, having yieldable spring connection 491 with said bail, will also be rocked downwardly until interrupted by engagement of a forward arm 490′ of said latch with a cam lug 492 (Figs. 2 and 16) formed as a part of the rear support frame 90 for stop bars 615. During total taking operations, frame 90 moves toward the right as earlier described, and lug 492 will be carried therewith out of engagement with arm 490′ whereupon latch 490 will fall into engagement with a pin 493 fast to the 9th order printing hammer to thus block movement of said hammer, and also through overlapping projection 160 the 8th order hammer, so that the date printing means will be ineffective during a totaling operation.

Upon restoration of frame 90, during the later part of a total taking cycle, the cam edge 492′ of lug 492 will lift latch 490 out of engagement with pin 493 to again re-enable the date hammers for any subsequent printing operations.

*Selective column overdraft control*

It is recalled that setting lever 400 (Fig. 6) in forward position holds pawl 406 in the path of movement of projection 408 of slide 409 to prevent rightward movement of said slide when support frame 90 is moved during totalizing operations. Slide 409 is held in its leftward position so that projection 414 will be in position to be acted upon by the higher order (9th column) rack arm 610 in effecting operation of the negative total devices.

In the adjustment of lever 400 to rearward statement printing position, bail 405 rocks downwardly, as previously described, and will rock pawl 406 downwardly away from projection 408. Slide 409 will now be held in its leftward position by means of the finger 416 (Fig. 7) and as said finger moves to the right with frame 90, slide 409 under influence of its spring 410 also moves toward the right, carrying projection 414 out of cooperative position with the higher order rack arm 610 to thus render ineffective the full capacity overdraft control.

Slide 409 is also provided with a second projection 494 which, in the leftward position of said slide, is in ineffective control position between the 8th and 7th orders actuator arms 610. In the above described rightward movement of slide 409, to disable control from the 9th order column, projection 494 will be moved into position to be acted upon by the rack arm 610 of the 7th order, and as said rack arm moves from 8 to 9 digit value position will thereupon effect operation of the overdraft devices in the manner as fully set forth in describing the control from the 9th order column.

While the preferred embodiment of the invention, set forth herein, is described as applied to the preparation of a customer's statement form, it is not limited thereto but is equally applicable to other uses, such as the printing of folio numbers, etc.

From the foregoing, it will be appreciated that the register actuating and printing devices of a simple adding listing machine may be utilized for the printing of dates, folio numbers or the like with the printing of item values concurrently therewith. Furthermore, there is provided a control means associated with a lower order numeral wheel actuator for accomplishing printing of credit item value totals as true negative totals in one position of a manually settable means while retaining the full capacity of places provided in the machine for other operations, including printing of true negative totals controlled from the higher order colum numeral wheel actuator in another position of the settable means.

It will also be appreciated that changes in the details of construction as shown and described may be made by those skilled in the art without departing from the spirit and scope of this invention as defined in the appended claims.

I claim:

1. A machine of the class described having a plurality of register wheels including tens carry devices for each of said wheels, moveable actuators for each of said wheels, means to reciprocate said actuators, type bars moveable in accordance with the positions of said actuators, printing hammers associated with said type bars, operating means for said hammers, total taking means, devices for converting a complemental value stored upon the register wheels to a true negative value including operating control devices therefor; enabling means for said control devices including an adjustable member adapted in one position for operation by a register wheel actuator of higher order and in another position for operation by a register wheel actuator of lower order for rendering said enabling means effective to cause said control devices to effect an operation of the true negative total devices.

2. The invention set forth in claim 1 wherein said enabling means includes a plurality of elements spaced relative to the register wheel actuators and adapted for selective cooperation with a related register wheel actuator whereby a given movement of said actuator will release said enabling means and permit operation of said control devices.

3. The invention set forth in claim 2 wherein the spaced elements are slidably mounted upon a pivoted latch having engagement with an arm of the control devices and releasable therefrom to enable operation of said devices.

4. The invention as set forth in claim 3 wherein said spaced elements comprise a pair of projections arranged so that one of said projections is normally in a position effective for cooperation with a register wheel actuator to release said latch and the other of said projections is in a position ineffective of cooperation with a register wheel actuator.

5. The invention set forth in claim 4 wherein the arrangement of said projections is such that an adjustment to bring one of said projections to effective position of cooperation with a related register wheel actuator to release the latching means serves also to displace the other projection out of effective position of cooperation with its related register wheel actuator, to thereby prevent unwanted release of the latching means by said other projection for releasing the latching means.

means for said control devices including an adjustable member adapted in one position for operation under control of a register wheel of higher order and in another position for operation under control of a register wheel of lower order to render said enabling means effective to cause said operating control devices to effect an operation of the true negative total devices.

HOWARD M. FLEMING.

References Cited in the file of this patent

UNITED STATES PATENTS

| Number | Name | Date |
|---|---|---|
| 2,095,368 | Muller | Oct. 12, 1937 |
| 2,229,834 | Anderson | Jan. 28, 1941 |
| 2,298,201 | Crosman | Oct. 6, 1942 |